United States Patent
Chen et al.

(10) Patent No.: US 10,579,908 B2
(45) Date of Patent: Mar. 3, 2020

(54) MACHINE-LEARNING BASED TECHNIQUE FOR FAST IMAGE ENHANCEMENT

(71) Applicant: Google LLC, Mountain View, CA (US)

(72) Inventors: Jiawen Chen, Mountain View, CA (US); Samuel Hasinoff, Sunnyvale, CA (US); Michael Gharbi, San Francisco, CA (US); Jonathan Barron, Alameda, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 15/843,345

(22) Filed: Dec. 15, 2017

(65) Prior Publication Data

US 2019/0188535 A1 Jun. 20, 2019

(51) Int. Cl.
*G06K 9/62* (2006.01)
*G06K 9/66* (2006.01)
*G06T 3/00* (2006.01)
*G06T 3/40* (2006.01)
(Continued)

(52) U.S. Cl.
CPC ............ *G06K 9/6262* (2013.01); *G06K 9/66* (2013.01); *G06T 3/0006* (2013.01); *G06T 3/4046* (2013.01); *G06T 5/00* (2013.01); *G06T 5/001* (2013.01); *G06T 2207/20081* (2013.01); *G06T 2207/20084* (2013.01); *H04N 5/23293* (2013.01)

(58) Field of Classification Search
CPC ....... G06K 9/6262; G06K 9/66; G06T 3/4046
See application file for complete search history.

(56) References Cited

U.S. PATENT DOCUMENTS

| 6,678,421 B1* | 1/2004 | Daniell | H04N 19/467 382/238 |
| 9,292,186 B2* | 3/2016 | Moore | G06F 3/04845 |
| 10,019,654 B1* | 7/2018 | Pisoni | G06K 9/6267 |

(Continued)

OTHER PUBLICATIONS

Gharbi et al., "Deep Bilateral Learning for Real-Time Image Enhancement", ACM Transaction on Graphics, 2017, vol. 36, No. 4, Article 118, 1-12.

(Continued)

*Primary Examiner* — Santiago Garcia
(74) *Attorney, Agent, or Firm* — McDonnell Boehnen Hulbert & Berghoff LLP

(57) ABSTRACT

Systems and methods described herein may relate to image transformation utilizing a plurality of deep neural networks. An example method includes receiving, at a mobile device, a plurality of image processing parameters. The method also includes causing an image sensor of the mobile device to capture an initial image and receiving, at a coefficient prediction neural network at the mobile device, an input image based on the initial image. The method further includes determining, using the coefficient prediction neural network, an image transformation model based on the input image and at least a portion of the plurality of image processing parameters. The method additionally includes receiving, at a rendering neural network at the mobile device, the initial image and the image transformation model. Yet further, the method includes generating, by the rendering neural network, a rendered image based on the initial image, according to the image transformation model.

18 Claims, 4 Drawing Sheets

(51) Int. Cl.
*G06T 5/00* (2006.01)
*H04N 5/232* (2006.01)

(56) References Cited

U.S. PATENT DOCUMENTS

| | | | | |
|---|---|---|---|---|
| 2015/0106699 | A1* | 4/2015 | Somasundaram | G06F 17/241 715/244 |
| 2016/0267382 | A1* | 9/2016 | Sullivan | G06N 5/022 |
| 2016/0284095 | A1* | 9/2016 | Chalom | H04N 5/23229 |
| 2016/0358035 | A1* | 12/2016 | Ruan | G06K 9/4676 |
| 2017/0061966 | A1* | 3/2017 | Marcheret | G10L 15/25 |
| 2017/0076145 | A1* | 3/2017 | Gottemukkula | G06K 9/00288 |
| 2017/0206441 | A1* | 7/2017 | Miyano | H04N 7/18 |
| 2017/0262962 | A1* | 9/2017 | Rad | G06F 17/18 |
| 2017/0286809 | A1* | 10/2017 | Pankanti | G06K 9/66 |
| 2017/0345130 | A1* | 11/2017 | Wang | G06T 3/4046 |
| 2018/0032846 | A1* | 2/2018 | Yang | G06K 9/00711 |
| 2018/0165508 | A1* | 6/2018 | Othman | G06K 9/00093 |
| 2018/0181834 | A1* | 6/2018 | Cui | G06K 9/00255 |
| 2018/0189229 | A1* | 7/2018 | Desoli | G06F 17/505 |
| 2018/0330474 | A1* | 11/2018 | Mehta | G06T 3/4076 |
| 2018/0365532 | A1* | 12/2018 | Molchanov | G06K 9/46 |
| 2018/0367752 | A1* | 12/2018 | Donsbach | G06K 9/66 |
| 2018/0373961 | A1* | 12/2018 | Wang | G06K 9/6253 |
| 2019/0019317 | A1* | 1/2019 | Zhang | G06T 7/0014 |
| 2019/0035118 | A1* | 1/2019 | Zhao | G06T 3/4046 |
| 2019/0050689 | A1* | 2/2019 | Guo | G06K 9/627 |
| 2019/0050942 | A1* | 2/2019 | Dalal | G06Q 40/08 |
| 2019/0080440 | A1* | 3/2019 | Eriksson | G06T 5/008 |
| 2019/0087661 | A1* | 3/2019 | Lee | G06K 9/00724 |

OTHER PUBLICATIONS

International Searching Authority, International Search Report and Written Opinion dated Oct. 4, 2018, issued in connection with International Patent Application No. PCT/US2018/039290, filed on Jun. 25, 2018, 14 pages.

Miildenhall et al., "Burst Denoising with Kernel Prediction Networks," Arxiv.org, Cornell University Library, Dec. 6, 2017, 10 pages.

Chen et al., "Bilateral Guided Upsampling," ACM Transactions on Graphics (Proceedings of SIGGRAPH Asia 2016) (Nov. 2016), 8 pages.

Chen et al., "Fast Image Processing with Fully-Convolutional Networks," Arvix.org, Cornell University Library, Sep. 2, 2017, 16 pages.

* cited by examiner

MACHINE-LEARNING BASED TECHNIQUE FOR FAST IMAGE ENHANCEMENT

BACKGROUND

Image capture devices, such as cameras, mobile phones, laptops, and tablets, now include image sensors that can record high-definition still images and video. However, manipulation and adjustment of such images is usually performed on desktop computers or graphics workstations due, at least in part, to substantial computing requirements necessary for image processing.

SUMMARY

Systems and methods described herein relate to image processing of images captured with mobile devices, which may include cameras, smartphones, tablets, head-mountable displays, and other image-capture devices. Namely, the methods and systems may include a machine learning process, which may provide inference data to a first neural network of a mobile device. The first neural network may receive an image and provide a compact image transformation model based on the image to a second neural network of the mobile device. The second neural network may render a processed image according to the image transformation model. In some cases, the processed image may be displayed on a viewfinder of a mobile device, such as a smartphone, or another type of device.

In a first aspect, a method is provided. The method includes receiving, at a mobile device, a plurality of image processing parameters. The method also includes causing an image sensor of the mobile device to capture an initial image. The method additionally includes receiving, at a coefficient prediction neural network at the mobile device, an input image based on the initial image. The method yet further includes determining, using the coefficient prediction neural network, an image transformation model based on the input image and at least a portion of the plurality of image processing parameters. The method includes receiving, at a rendering neural network at the mobile device, the initial image and the image transformation model. The method additionally includes generating, by the rendering neural network, a rendered image based on the initial image, according to the image transformation model.

In a second aspect, a method is provided. The method includes, during a training phase, receiving at a server, a plurality of image pairs. A first image of each image pair includes a respective initial training image. A second image of each image pair includes a respective output training image. The method also includes, during the training phase, determining, by the server, a plurality of image processing parameters based on the plurality of image pairs. The method additionally includes, during the training phase, transmitting the plurality of image processing parameters to a mobile device. The method includes, during a prediction phase, causing an image sensor of the mobile device to capture an initial image. The method further includes, during the prediction phase, receiving, at a coefficient prediction neural network at the mobile device, an input image based on the initial image. The method also includes, during the prediction phase, determining, using the coefficient prediction neural network, an image transformation model based on the input image and at least a portion of the plurality of image processing parameters. The method yet further includes, during the prediction phase, receiving, at a rendering neural network at the mobile device, the initial image and the image transformation model. The method additionally includes, during the prediction phase, generating, by the rendering neural network, a rendered image based on the initial image, according to the image transformation model.

In a third aspect, a mobile device is provided. The mobile device includes an image sensor and at least one tensor processing unit operable to execute instructions to carry out operations. The operations include receiving a plurality of image processing parameters and causing the image sensor to capture an initial image. The operations also include receiving, at a coefficient prediction neural network, an input image based on the initial image. The operations yet further include determining, using the coefficient prediction neural network, an image transformation model based on the input image and at least a portion of the plurality of image processing parameters. The operations additionally include receiving, at a rendering neural network, the initial image and the image transformation model. The operations also include generating, by the rendering neural network, a rendered image based on the initial image, according to the image transformation model.

In a further aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
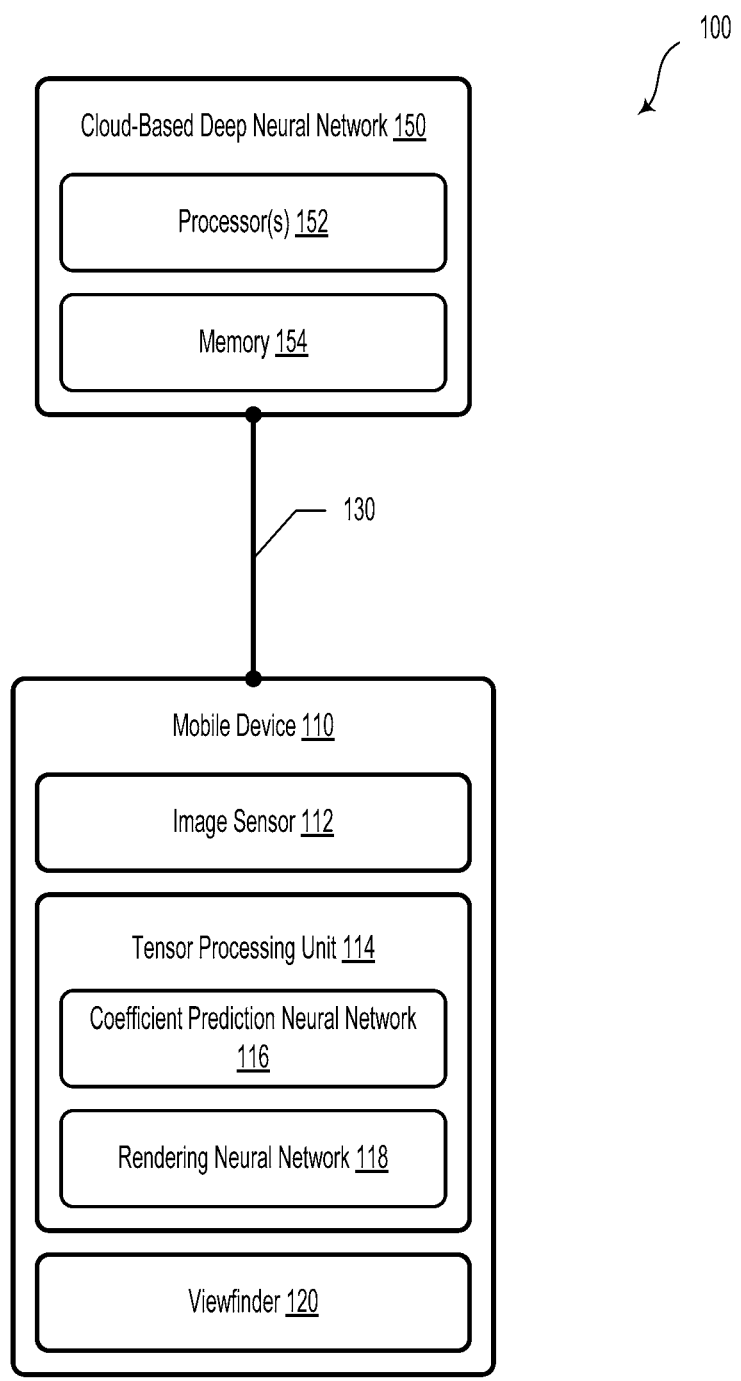
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Performance is a challenge in real-time mobile image processing. While sophisticated algorithms can produce high quality results, they are often too slow to run on smartphones, which is where the vast majority of digital images are now captured and processed. Such performance issues are especially important for viewfinders, which give the photographer a preview of the image they are about to capture. If the viewfinder does not closely match that of the final output, the user loses confidence in his/her device's ability to capture the moment.

Here, example methods and systems based on deep neural networks and machine learning are described. Such examples can faithfully reproduce the results of sophisticated image-processing algorithms, but are computationally inexpensive and power-efficient on mobile hardware.

Specifically, embodiments herein utilize machine learning to efficiently approximate an image processing pipeline. Some methods may include two phases: a training phase and an inference phase. During the training phase, a collection of pairs of images (usually on the order of 1,000-10,000, although different numbers of image pairs are possible) are input into a cloud-based deep neural network (DNN) utilizing one or more graphics processing units (GPUs). Each image pair includes an input image and its output after executing the image-processing pipeline to be reproduced. A useful feature of this system is that the pipeline may include an image-processing program or photo editing done by human editors/artists (using, for example, Adobe Photoshop or Lightroom).

The training of the cloud-based DNN may be performed offline (ahead of time) and may take about 4 days on a single desktop workstation equipped with a GPU. It can be greatly accelerated by using a cluster of computers equipped with multiple GPUs. Training compares the neural network's current output with the expected output provided in the training data. Based on discrepancies from such comparisons, the cloud-based DNN may update parameters known as weights (e.g., image transformation parameters). Such updating may be performed for a number of iterations until convergence is reached—when the error between the network's prediction and the expected output is small and hence the weights no longer change more than a threshold amount.

After training, the frozen set of weights effectively encodes an inference program, which may reside on a mobile device (e.g., a smartphone or another type of digital camera). This program can be compact and is efficiently executed by a processor that supports the Tensorflow inference runtime application program interface, although other implementations are possible.

The mobile device may capture an initial image, or a user may select the initial image for image processing. In some examples, the initial image may be downsampled to a relatively low-resolution "thumbnail" image. A neural network arranged at the mobile device is logically partitioned into two components: a coefficient prediction neural network and a rendering neural network. The coefficient prediction neural network accepts the input image and predicts a compact "formula" (e.g., an image processing model) of how to transform the input image in the form of a bilateral grid of affine matrices. Subsequently, the rendering neural network takes the input image, and applies the formula from the coefficient prediction neural network to produce the final rendered output image.

By handling very low-resolution input images, the coefficient prediction neural network is both fast and effective because the bilateral grid of affine matrices provides a good way to extrapolate the model/transform for application on the high-resolution initial image.

The model/transform provided by the coefficient prediction neural network may be very compact: only 16×16×8×3×4 (~24000 numbers), regardless of the image size. Moreover, its interpretation as a bilateral grid of affine matrices prevents introduction of artifacts present in other types of neural network architectures that produce images.

The model/image transform compares favorably to state-of-the-art operators for tone mapping, style transfer, and recoloring. The curves for such transforms are computed by lifting the input into a bilateral grid and then solving for the 3D array of affine matrices that best maps input color to output color per x, y, intensity bin. A smoothness term is enforced on the matrices which can prevent false edges and amplification of noise. This energy may be optimized globally, or a solution may be more quickly approximated by locally fitting matrices and then enforcing smoothness by blurring in grid space. This latter option reduces to joint bilateral upsampling or the guided filter depending on the choice of parameters. The cost of running the algorithm is reduced to the cost of running the original algorithm at greatly reduced resolution, as fitting the curves takes about 10 ms on mobile devices, and 1-2 ms on desktop CPUs, and evaluating the curves can be done with a simple GPU shader.

Rendering can operate at full initial image resolution despite the fact that the model is compact, and is extremely efficient to run on GPUs using standard interfaces (e.g., OpenGL ES 3.0).

Such methods and systems could be used in various fields, such as with smartphone devices (e.g., photo, panorama, and video modes), home automation devices (e.g., surveillance videos), virtual reality (e.g., light field capture), and/or robotics (e.g., improving image quality for robot vision applications).

Methods and systems described herein may also be used for fast image processing on platforms that have both a camera and hardware accelerators for graphics (OpenGL ES capable) and/or machine learning hardware (e.g., deep learning hardware such as the chips from manufacturers such as NVIDIA and MOVIDIUS). This technology is could be utilized for real-time imaging applications such as smartphone camera viewfinders, video surveillance, or real-time robot vision.

II. Example Systems

FIG. 1 illustrates a system 100, according to an example embodiment. The system 100 includes a cloud-based deep neural network 150 and at least one mobile device 110.

The cloud-based deep neural network 150 may include one or more servers, which may themselves include one or more processors 152 and memory 154. While reference is made to a "cloud-based" computing network, it will be understood that other types of computing resources, such as a local desktop computer, a local server, or a virtual computing resource, are contemplated herein. The cloud-based deep neural network 150 could be configured to execute instructions so as to carry out operations.

As an example, the cloud-based deep neural network 150 could determine a plurality of image processing parameters based on a set of training images. For example, the cloud-based deep neural network 150 could be subject to a machine-learning process to "learn" how to manipulate images like human professionals. As an example, the set of training images could include a plurality of image pairs. For instance, the cloud-based deep neural network 150 could analyze 1,000-10,000 image pairs. Each of the image pairs could include an "original" image and an "optimized" image. In an example embodiment, the optimized images could be adjusted by humans using image processing/manipulation programs such as Adobe Lightroom, Adobe Photoshop, Adobe Photoshop Elements, Google Picasa, Microsoft Photos, DxO OpticsPro, Corel PaintShop Pro, or Apple Photos. It will be understood that other types of image processing software are possible and contemplated herein. Alternatively, the image pairs could represent adjustment of original images using preset or random filters or other image adjustment algorithms.

During the machine-learning process, the cloud-based deep neural network 150 could determine a set of "weights" representative of different types of image manipulations made by humans. More specifically, these weights could be associated with various image parameters, such as exposure, clarity, contrast, sharpness, hue, saturation, color, chromatic aberration, focus, tint, white balance, color mapping, HDR tone mapping, etc. It will be understood that weights associated with other image parameters are possible. Over time, and with a sufficient number of training images, the cloud-based deep neural network 150 could develop these weights as a set of image processing parameters that could represent inference information for an image-processing deep neural network.

The cloud-based deep neural network 150 could be communicatively coupled to the mobile device 110. As an example, the cloud-based deep neural network 150 and the mobile device 110 could be coupled with a communication interface 130. The communication interface 130 could be configured to transmit information from the cloud-based deep neural network 150 to the mobile device 110, or vice-versa.

The communication interface 130 can include a wired and/or wireless communication link. As an example, the communication interface 130 could be established over LTE or another cellular communication protocol, BLUETOOTH, BLUETOOTH LOW ENERGY, Wireless LAN, WiMAX, IEEE 802.11, ZIGBEE, or another type of communication protocol or method. The communication interface 130 could be configured to provide a bi-directional communication link between the cloud-based deep neural network 150 and the mobile device 110. In some example embodiments, the cloud-based deep neural network 150 could transmit the image processing parameters to the mobile device 110.

The mobile device 110 could include an image sensor 112 and at least one tensor processing unit 114. The tensor processing unit 114 could include a coefficient prediction neural network 116 and a rendering neural network 118. In some embodiments, the tensor processing unit 114 could include software running on one or more central processing units (CPUs) and/or graphics processing units (GPUs). For instance, the tensor processing unit 114 could include a multi-core CPU (e.g., Qualcomm Snapdragon), a plurality of GPUs, or general purpose graphics processing units (GPGPUs). Without limitation, as described herein, GPUs could include one or more of: Qualcomm Adreno, Imagination Technologies Power VR, ARM Mali, GeForce GTX, nVidia Tesla, nVidia Quadro, nVidia Titan X, AMD FirePro, or AMD FireStream. It will be understood that many other types of CPUs and GPUs are possible and contemplated in light of the present disclosure.

In cases where the tensor processing unit 114 includes a GPU, some image processing functions could be accelerated compared to CPUs. For example, a GPU may provide acceleration for texture mapping, rotation, translation, shading, and/or other image processing or image rendering functions.

In some embodiments, the tensor processing unit 114 could include at least one application-specific integrated circuit (ASIC). Additionally or alternatively, the tensor processing unit 114 could include at least one virtual machine having at least one persistent disk or memory resource.

As described herein, a "neural network" may include an artificial neural network (ANN). Such a network could be modeled after biological brain systems. For example, the neural networks described herein may include a collection of connected units called artificial neurons, each of which may be configured to transmit a signal (via an artificial "synapse") to one or more other artificial neurons. In an example embodiment, the collection of artificial neurons may be arranged in one or more hierarchical layers.

In some embodiments, the artificial neurons and/or the synapses could include associated "weights", which can increase or decrease the strength of given signals that could be passed to subsequent neurons. Furthermore, the ANN could be configured to carry out a backpropagation algorithm. The backpropagation algorithm could calculate a gradient of the loss function with respect to a given state and a set of weights of the ANN. In some examples, the neural network could utilize one or more learning algorithms, such as a gradient descent algorithm. It will be understood that other types of learning algorithms, such as steepest descent, simulated annealing, gene expression, particle swarm optimization, among other variants, are possible and contemplated herein.

As learning progresses in the neural network, the weights of the associated neurons and synapses may be adjusted until an average global adjustment is less than a predetermined threshold. The predetermined threshold could represent a learning threshold or learning level/stage.

In some embodiments, the neural network could be governed or otherwise organized by one or more learning rules, learning frameworks, or set of beliefs. As an example, the neural networks described herein could be configured to operate based on one or more learning paradigms. The learning paradigms could include unsupervised learning, supervised learning, and/or reinforcement learning. Furthermore, while examples described herein are primarily illustrative of a supervised learning paradigm, it will be understood that unsupervised learning and/or reinforcement learning could be utilized in similar ways to achieve similar results.

The mobile device 110 could also include a viewfinder 120. In some example embodiments, the viewfinder 120 could include a display of a smartphone. However, other types of displays are possible and contemplated.

The tensor processing unit 114 can be operable to execute instructions to carry out various operations. In some example embodiments, the operations could include receiving a plurality of image processing parameters. In such a scenario, the tensor processing unit 114 could receive the plurality of image processing parameters from the cloud-based deep neural network 150 (e.g., by the communication interface 130).

The tensor processing unit 114 may cause the image sensor 112 to capture an initial image. Additionally or alternatively, a user may select the initial image for image processing. The initial image could include one or more image frames. In some embodiments, the image sensor 112 may be configured to capture RAW images or another type of image format. Furthermore, some embodiments may include various graphical image formats, such as raster image formats (e.g., JPEG, TIFF, GIF, BMP, PNG, WebP, etc.), vector image formats (e.g., SVG, Gerber, CGM, or other 2D/3D vector formats), stereoscopic image formats, or multiscopic image formats. Some images arranged in such graphical image formats may be compressed to varying degrees, for example according to lossless and/or lossy image file compression algorithms.

In some embodiments, the initial image may be captured a relatively high-resolution (e.g., greater than a megapixel). Thereafter, the initial image may be downsampled to a relative low-resolution image.

The operations may include receiving, at the coefficient prediction neural network 116, an input image based on the initial image. The input image could include the downsampled low-resolution image. In other embodiments, the input image could include a portion of the initial image.

The operations could also include determining, using the coefficient prediction neural network 116, an image transformation model based on the input image and at least a portion of the plurality of image processing parameters. In other words, the coefficient prediction neural network 116 could provide a "formula" for manipulating the input image based on the inference data provided by the cloud-based deep neural network 150. The image transformation model or "formula" could represent a "best estimate," based on the training data, of how to adjust the input image to obtain a predetermined output image.

Furthermore, the operations could include receiving, at the rendering neural network 118, the initial image and the image transformation model. The operations may additionally include generating, by the rendering neural network 118, a rendered image based on the initial image, according to the image transformation model. That is, the rendering neural network 118 could manipulate the image according to the formula (e.g., the image transformation model) determined by the coefficient prediction neural network 116. In such a scenario, the operations could also include displaying the rendered image on the viewfinder 120.

Figure 2:
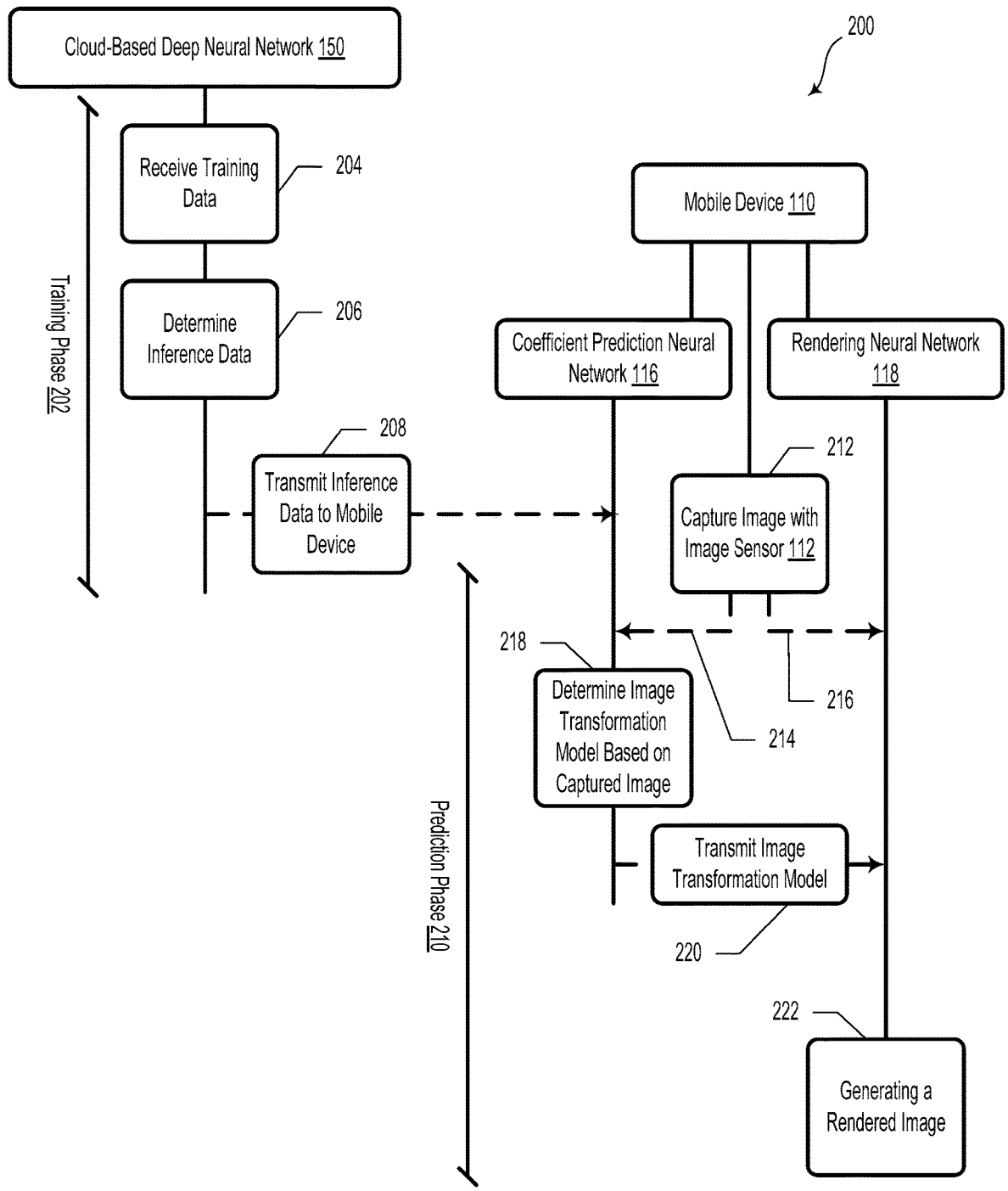
FIG. 2 illustrates a schematic flow diagram, according to an example embodiment.

FIG. 2 illustrates a schematic flow diagram 200, according to an example embodiment. Flow diagram 200 includes various elements, such as cloud-based deep neural network 150 and mobile device 110, as illustrated and described in reference to FIG. 1. Furthermore, flow diagram 200 includes various steps or blocks that could be carried out by the cloud-based deep neural network 150 and/or the mobile device 110.

In an example embodiment, a training phase 202 could take place at the cloud-based deep neural network 150 in advance (e.g., before image transformation "runtime"). Block 204 includes receiving training data, which may include a plurality of image pairs. A first image of each image pair could include an "original" image. A second image of each image pair could include an "optimized" image, which could include one or more modifications or image transformations, in some cases, suggested or directed by users or a predetermined algorithm.

Block 206 includes, during the training phase 202, the cloud-based deep neural network 150 could determine inference data (e.g., image transformation parameters). For example, the neural network could "learn" proper image modifications by adjusting weights associated with one or more neurons or synapses of the neural network while carrying out a gradient descent optimization algorithm. It will be understood that other optimization algorithms or least-loss algorithms are possible and contemplated. In some embodiments, the training phase 202 could take minutes, hours, or several days.

Block 208 includes transmitting the inference data to mobile device 110. In an example embodiment, the transmission of the inference data could be performed over communication interface 130. Furthermore, the inference data could be input into the coefficient prediction neural network 116 of the mobile device 110. Put another way, the inference data could encode an inference program running on the mobile device 110.

During a prediction phase 210, block 212 could include capturing an initial image with image sensor 112. In some embodiments, the initial image could be captured at a full resolution of the image sensor 112. Thereafter, the initial image could be downsampled to provide a lower-resolution "thumbnail" input image. In an example embodiment, the thumbnail input image could include a 256×256 downsampled version of the initial image.

In block 214, the initial image and/or the input image could be provided to the coefficient prediction neural network 116.

Block 216 includes providing the initial image and/or the input image to the rendering neural network 118.

In block 218, the coefficient prediction neural network 116 can determine an image transformation model based on the initial image and/or the input image. The image transformation model could include, for example, a compact "formula" that describes how to modify the initial image or input image to "optimize" it in view of the inference data, which could be based on thousands of modified/retouched images.

In some examples, the image transformation model may be trained using a ground-truthed deep learning process. For instance, the learning process could utilize image pairs that include "before" (raw, unretouched) images and "after" (processed using HDR+ and/or other effects) images. Training the coefficient prediction neural network 116 could include adjusting neural network weights such that the determined image transformation model works well (or better than a predetermined fitness or difference threshold) with the training data. In such a scenario, the coefficient prediction neural network 116 can learn whatever needed such that its output (the image transformation model) can accurately turn the "before" images into the "after" images in a desired manner. As described elsewhere herein, the image transformation model can include a function that maps the "before" images to an appropriate bilateral-space affine transformation that transforms the input image into the desired output image.

In some embodiments, the coefficient prediction neural network 116 need only handle very low-resolution input images. In such scenarios, the coefficient prediction neural network 116 could operate both quickly and effectively because a bilateral grid of affine matrices can provide a good way to extrapolate the model/image transform for application on the high-resolution initial image (e.g., at the rendering stage).

Block 220 could include transmitting the image transformation model to the rendering neural network 118.

Block 222 includes generating a rendered image based on the image transformation model and the initial image. In some embodiments, the rendered image could be rendered at high-resolution (e.g., at a similar resolution as the initial image). That is, the rendering neural network 118 could be configured to solve rendering equations to provide an output image, which may take the form of an image file. The rendering neural network 118 may apply shading, texture-mapping, shadows, reflections, depth-of-field, motion blur, lighting effects, or other effects to produce the output image. The high-resolution rendered image could be displayed on a viewfinder of the mobile device or another type of display.

III. Example Methods

Figure 3:
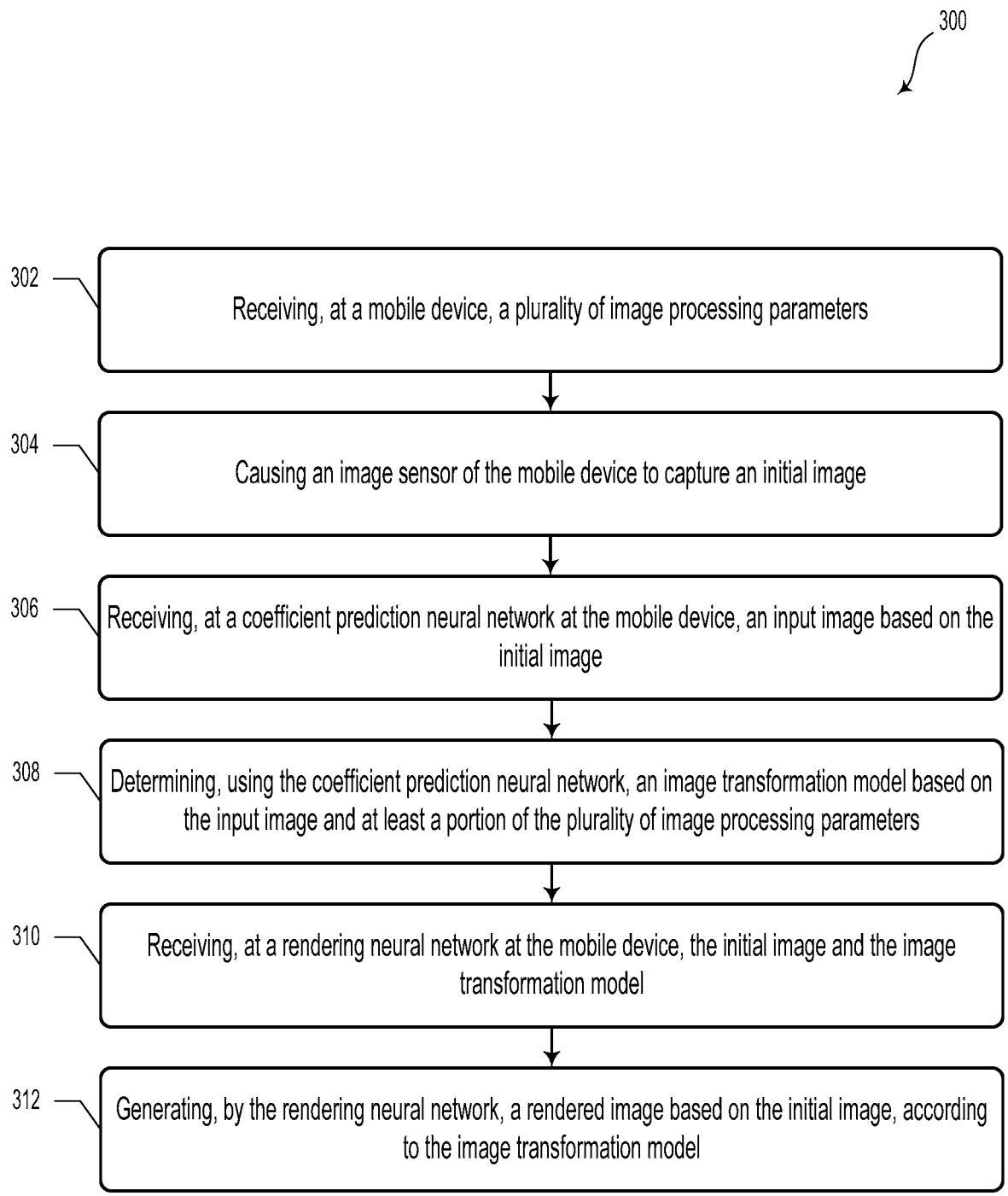
FIG. 3 illustrates a method, according to an example embodiment.

FIG. 3 illustrates a method 300, according to an example embodiment. The method 300 may include various blocks or steps. The blocks or steps may be carried out individually or in combination. The blocks or steps may be carried out in any order and/or in series or in parallel. Further, blocks or steps may be omitted from or added to method 300.

Some or all blocks of method 300 may involve elements of system 100 and/or flow diagram 200 as illustrated and described in reference to FIGS. 1 and 2. Furthermore, some or all blocks of method 300 may be carried out by the cloud-based deep neural network 150 (e.g., processor 152 and memory 154) and/or the mobile device 110 (e.g., tensor processing unit 114).

While examples herein may describe image processing of discrete images, it will be understood that the described systems and methods could be applied to video clips or video streams.

Block 302 includes receiving, at a mobile device, a plurality of image processing parameters. The plurality of image processing parameters could include, for example, inference information determined by, and received from, the cloud-based deep neural network 150. In some embodiments, the receiving of the plurality of image processing parameters could be performed by the communication interface 130 or another type of communication link.

Block 304 includes causing an image sensor of the mobile device to capture an initial image.

Optionally, method 300 may include downsampling the initial image to provide the input image. In such a scenario, the input image could include a downsampled (e.g., lower resolution) version of the initial image. As an example, the input image could include no more than 256 pixels along a first image dimension and no more than 256 pixels along a second image dimension. It will be understood that other input image resolutions and pixel formats are possible. For instance, a shape of the input image could include a square, a rectangle, a circle, or a line. Furthermore, the input image could include between 1 to 1024 pixels along the first image dimension and/or between 1 to 1024 pixels along the second image dimension.

Block 306 includes receiving, at a coefficient prediction neural network at the mobile device, an input image based on the initial image;

Block 308 includes determining, using the coefficient prediction neural network, an image transformation model based on the input image and at least a portion of the plurality of image processing parameters. In some embodiments, the image transformation model could include a transformation data set. In such a scenario, the transformation data set can include at least five dimensions.

In an example embodiment, the transformation data set could include a bilateral grid of affine matrices. In such a scenario, the affine matrices may include a function between affine spaces, which may preserve points, straight lines, and/or planes. For example, the transformation data set could preserve ratios of distances between points lying along a straight line. In some examples, the transformation data set may include a translation and linear map. In some embodiments, the transformation data set could be arranged in a form of a 16×16×8×3×4 data set.

Block 310 includes receiving, at a rendering neural network at the mobile device, the initial image and the image transformation model; and Block 312 includes generating, by the rendering neural network, a rendered image based on the initial image, according to the image transformation model. In such a scenario, generating the rendered image could be performed, at least in part, by an application programming interface (API) running on at least one graphics processing unit (GPU). In some embodiments, rendering can be performed at full initial image resolution.

Furthermore, method 300 could include displaying the rendered image on a viewfinder of the mobile device. Such displaying could provide a "live view" image on the viewfinder.

In some embodiments, at least one of the coefficient prediction neural network or the rendering neural network could be operable to carry out a Tensorflow inference runtime program.

Figure 4:
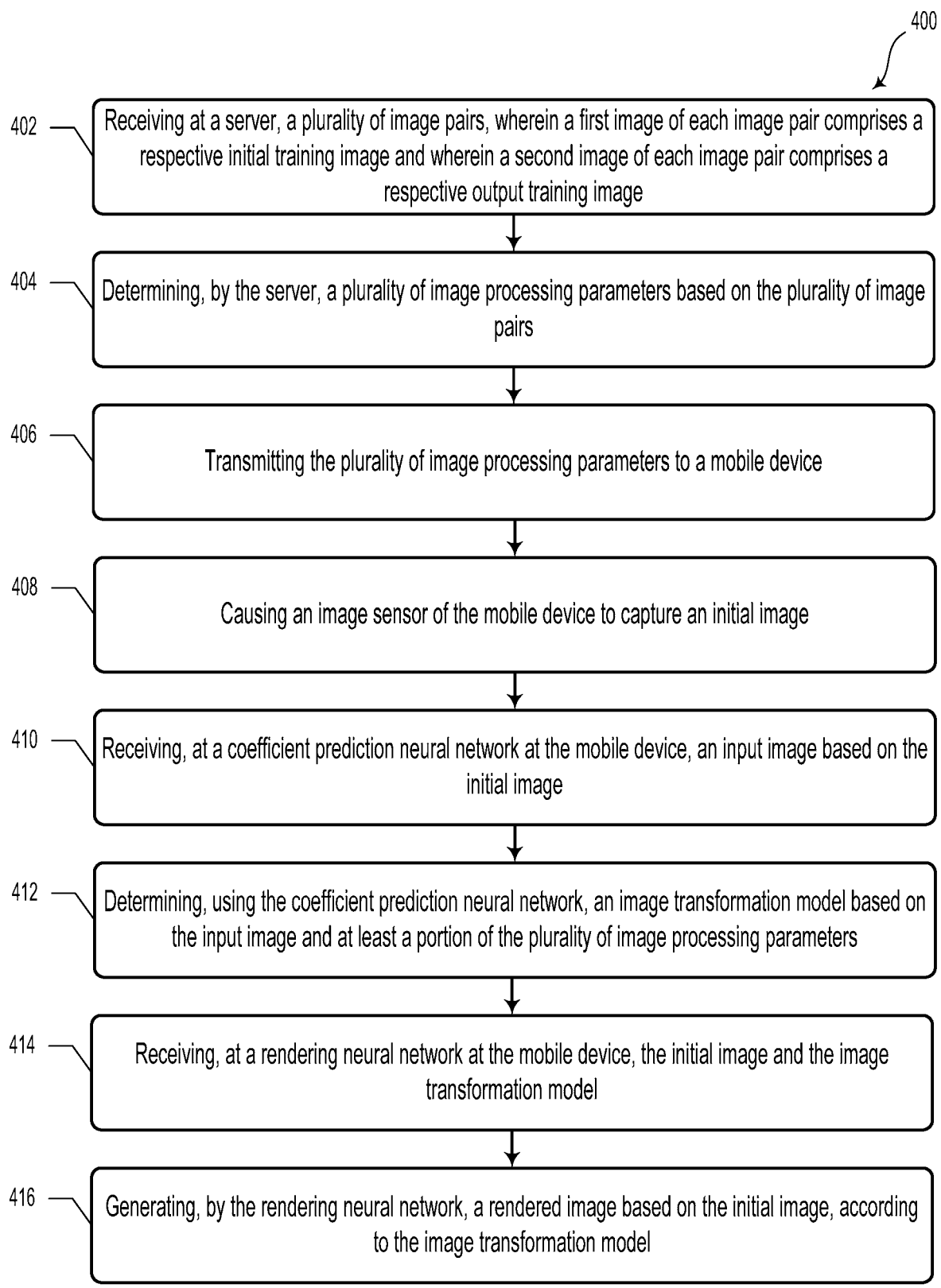
FIG. 4 illustrates a method, according to an example embodiment.

FIG. 4 illustrates a method 400, according to an example embodiment. The method 400 may include various blocks or steps. The blocks or steps may be carried out individually or in combination. The blocks or steps may be carried out in any order and/or in series or in parallel. Further, blocks or steps may be omitted from or added to method 400.

Some or all blocks of method 400 may involve elements of system 100 and/or flow diagram 200 as illustrated and described in reference to FIGS. 1 and 2. Furthermore, some or all blocks of method 400 may be carried out by the cloud-based deep neural network 150 (e.g., processor 152 and memory 154) and/or the mobile device 110 (e.g., tensor processing unit 114).

Block 402 includes, during a training phase, receiving at a server (e.g., cloud-based deep neural network 150), a plurality of image pairs. In such a scenario, a first image of each image pair includes a respective initial training image. Additionally, a second image of each image pair could include a respective output training image.

Block 404 includes, during the training phase, determining, by the server, a plurality of image processing parameters based on the plurality of image pairs. In an example embodiment, the training phase may include comparing the neural network's current output with the expected output provided in the training data.

Block 406 includes transmitting the plurality of image processing parameters to a mobile device (e.g., mobile device 110).

Block 408 includes, during a prediction phase, causing an image sensor of the mobile device to capture an initial image.

Block 410 includes, during the prediction phase, receiving, at a coefficient prediction neural network at the mobile device, an input image based on the initial image. In some embodiments, method 400 may include downsampling the initial image to provide the input image. In such scenarios, the input image could include a downsampled version of the initial image. For example, the input image could include no more than 256 pixels along a first image dimension and no more than 256 pixels along a second image dimension.

Block 412 includes, during the prediction phase, determining, using the coefficient prediction neural network, an image transformation model based on the input image and at least a portion of the plurality of image processing parameters. In some embodiments, the image transformation model includes a transformation data set, wherein the transformation data set includes at least five dimensions. Additionally or alternatively, the transformation data set could include a bilateral grid of affine matrices. As an example, the transformation data set could have a form of a 16×16×8×3×4 data set. Other data set dimensions are possible and contemplated herein.

In an example embodiment, the transformation data set could include a three-dimensional grid of proper (3×4) matrices. The 16×16 dimensions could include spatial (XY) coordinates for each pixel in the downsampled image. The 8 dimensions could include brightness of each pixel. The 3×4 dimensions could include matrices defining an affine transformation. Namely, the input red, green, blue, and bias channels could be the 4 input dimensions and output red, green, and blue channels could be the 3 output dimensions. In other words, such a data set could represent a three-dimensional bilateral grid where each vertex includes an affine transformation from the input RGB channels to the output RGB channels. The 3×4 dimensions could be adjusted based on, for example, a type of a camera sensor utilized (RGB, luminance only, etc.) The 16×16×8 dimensions could vary based on application and/or available image processing resources. The described 16×16×8 dimensions could include an empirically reasonable dimensionality to downsample the image spatially with regard to brightness.

Block 414 includes, during the prediction phase, receiving, at a rendering neural network at the mobile device, the initial image and the image transformation model.

Block 416 includes generating, by the rendering neural network, a rendered image based on the initial image, according to the image transformation model. In some embodiments, generating the rendered image could performed, at least in part, by an application programming interface running on at least one graphics processing unit. In such a scenario, the application programming interface could include Open GL for Embedded Systems. Other graphics-based or image-based APIs are possible and contemplated.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
receiving, at a mobile device, a plurality of image processing parameters;
causing an image sensor of the mobile device to capture an initial image;
downsampling the initial image to provide an input image, wherein the input image comprises a downsampled version of the initial image;
subsequent to the downsampling, receiving, at a coefficient prediction neural network at the mobile device, the input image;
determining, using the coefficient prediction neural network, an image transformation model based on the input image and at least a portion of the plurality of image processing parameters;
receiving, at a rendering neural network at the mobile device, the initial image and the image transformation model;
generating, by the rendering neural network, a rendered image based on the initial image, according to the image transformation model; and
displaying the rendered image on a viewfinder of the mobile device.

2. The method of claim 1, wherein the initial image is a high-resolution image, wherein the input image is a low-resolution image, and wherein the input image comprises no more than 256 pixels along a first image dimension and no more than 256 pixels along a second image dimension.

3. The method of claim 1, wherein the image transformation model comprises a transformation data set, wherein the transformation data set includes at least five dimensions.

4. The method of claim 3, wherein the transformation data set includes a bilateral grid of affine matrices.

5. The method of claim 3, wherein the transformation data set has a form of a 16×16×8×3×4 data set.

6. The method of claim 1, wherein generating the rendered image is performed, at least in part, by an application programming interface running on at least one graphics processing unit.

7. The method of claim 1, wherein at least one of the coefficient prediction neural network or the rendering neural network is operable to carry out a Tensorflow inference runtime program.

8. A method comprising:
during a training phase:
receiving at a server, a plurality of image pairs, wherein a first image of each image pair comprises a respective initial training image and wherein a second image of each image pair comprises a respective output training image;
determining, by the server, a plurality of image processing parameters based on the plurality of image pairs; and transmitting the plurality of image processing parameters to a mobile device; and during a prediction phase:

causing an image sensor of the mobile device to capture an initial image;

downsampling the initial image to provide an input image, wherein the input image comprises a downsampled version of the initial image;

subsequent to the downsampling, receiving, at a coefficient prediction neural network at the mobile device, the input image;

determining, using the coefficient prediction neural network, an image transformation model based on the input image and at least a portion of the plurality of image processing parameters;

receiving, at a rendering neural network at the mobile device, the initial image and the image transformation model;

generating, by the rendering neural network, a rendered image based on the initial image, according to the image transformation model; and displaying the rendered image on a viewfinder of the mobile device.

9. The method of claim 8, wherein the initial image is a high-resolution image, wherein the input image is a low-resolution image, and wherein the input image comprises no more than 256 pixels along a first image dimension and no more than 256 pixels along a second image dimension.

10. The method of claim 8, wherein the image transformation model comprises a transformation data set, wherein the transformation data set includes at least five dimensions.

11. The method of claim 10, wherein the transformation data set includes a bilateral grid of affine matrices.

12. The method of claim 10, wherein the transformation data set has a form of a 16×16×8×3×4 data set.

13. The method of claim 8, wherein generating the rendered image is performed, at least in part, by an application programming interface running on at least one graphics processing unit, wherein the application programming interface comprises Open GL for Embedded Systems.

14. A mobile device comprising:

an image sensor;

a viewfinder;

at least one tensor processing unit operable to execute instructions to carry out operations, the operations comprising:

receiving a plurality of image processing parameters;

causing the image sensor to capture an initial image;

downsampling the initial image to provide an input image, wherein the input image comprises a downsampled version of the initial image;

subsequent to the downsampling, receiving, at a coefficient prediction neural network, the input image;

determining, using the coefficient prediction neural network, an image transformation model based on the input image and at least a portion of the plurality of image processing parameters;

receiving, at a rendering neural network, the initial image and the image transformation model;

generating, by the rendering neural network, a rendered image based on the initial image, according to the image transformation model; and displaying the rendered image on the viewfinder.

15. The mobile device of claim 14, wherein the tensor processing unit comprises at least one application-specific integrated circuit.

16. The mobile device of claim 14, wherein the tensor processing unit comprises at least one virtual machine having at least one persistent disk or memory resource.

17. The method of claim 3, wherein the transformation data set includes a three-dimensional grid of proper (3×4) matrices.

18. The method of claim 10, wherein the transformation data set includes a three-dimensional grid of proper (3×4) matrices.

* * * * *